(12) United States Patent
Kojima et al.

(10) Patent No.: US 7,095,011 B2
(45) Date of Patent: Aug. 22, 2006

(54) PHOTOELECTRIC ENCODER FOR PRECISE MEASUREMENTS

(75) Inventors: Kenji Kojima, Kawasaki (JP); Tomotaka Takahashi, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 102 days.

(21) Appl. No.: 10/846,437

(22) Filed: May 14, 2004

(65) Prior Publication Data
US 2004/0238728 A1    Dec. 2, 2004

(30) Foreign Application Priority Data
May 16, 2003 (JP) ............... 2003-139061

(51) Int. Cl.
*G01D 5/34* (2006.01)
(52) U.S. Cl. ............... 250/231.13
(58) Field of Classification Search ............... 250/231.13–231.18, 237 G
See application file for complete search history.

(56) References Cited

U.S. PATENT DOCUMENTS

| | | | |
|---|---|---|---|
| 3,427,463 A | 2/1969 | Weyrauch | |
| 4,983,825 A * | 1/1991 | Ichikawa et al. | 250/231.16 |
| 5,841,133 A | 11/1998 | Omi | |
| 6,476,405 B1 * | 11/2002 | Henshaw | 250/559.29 |

FOREIGN PATENT DOCUMENTS

JP        07-151565        6/1995

OTHER PUBLICATIONS

WO 01/31292 A1, Displacement Measuring Device, Publication Date: May 3, 2001.

* cited by examiner

*Primary Examiner*—Thanh X. Luu
(74) *Attorney, Agent, or Firm*—Rankin, Hill, Porter & Clark LLP (57) ABSTRACT

A plurality of photodiodes are disposed along a measurement axis on an optical receipt chip of a photoelectric encoder. Formed on each light acceptance surface of these photodiodes is a second optical grating which has more than one light shield portion extending in a "y" direction. Each acceptance surface has a portion that is disposed obliquely relative to the extending direction of the light shield portion.

5 Claims, 5 Drawing Sheets

PHOTOELECTRIC ENCODER FOR PRECISE MEASUREMENTS

CROSS-REFERENCE TO PRIOR APPLICATION(S)

This application is based upon and claims the benefit of priority from the prior Japanese Patent Application No. 2003-139061, filed on May 16, 2003, the entire contents of which are incorporated herein by reference.

BACKGROUND OF THE INVENTION

1. Field of the Invention

The present invention relates to photoelectric encoders used for precise measurement.

2. Description of Related Art

In prior known applications, photoelectric encoders (referred to as "encoder" in some cases) are utilized for high-precision measurement of linear and angular displacement amounts. Encoders are equipped in three-dimensional (3D) measuring equipment, image measuring apparatus and others. An encoder is generally constituted from a light source, a scale including an optical grating, and a light-receiving unit which is disposed to be relatively movable together with the light source with respect the scale. The light-receiving unit, also known as photosensor module, includes four light-receiving elements (for example, photodiodes) and four index gratings which are laid out at locations corresponding to the light acceptance surfaces of respective light-receiving elements and which are different in phase from one another.

An operation of the encoder will be briefly explained below. While causing the light source and the light-receiving unit to relatively move together with respect to the scale, light from the light source is guided to progress through an optical system including the optical grating of the scale and then fall onto the four index gratings of the light-receiving unit. More specifically, while letting the index gratings of the light-receiving unit move relative to the optical grating of the scale, a pattern of interference fringes (light-and-shade pattern) that is created by irradiation of the light from the light source onto the optical grating of the scale is guided to hit the index gratings of the light-receiving unit. This results in production of four separate optical signals each having a sinusoidal or "sine" waveform indicative of a change in light intensity. These optical signals are different in phase from one another. The light signals are to be received and sensed by light-receiving elements corresponding to respective phases to thereby produce photoelectrically converted electrical signals, which are used for measurement of a position change amount, such as a linear displacement.

The four phase-different optical signals of interest are an optical signal with a phase "A" (zero degrees), an optical signal with a phase "B" (90 degrees) which is deviated or offset by 90 degrees from the phase A, an optical signal with a phase "AA" (180 degrees) that is offset by 180 degrees from the phase A, and an optical signal with a phase "BB" (270 degrees) as offset by 270 degrees from the phase A. Using the phase A and phase B is to determine or "judge" the direction of relative movement of the light-receiving unit in a way depending upon which one of the phases A and B is to be detected first. Additionally, the use of those light signals with the phases AA and BB—these are phase-inverted versions of the light signals with phases A and B, respectively—in addition to the light signals with phases A and B is aimed at (1) removal of DC components contained in the light signals with phases A and B, (2) achievement of the reliability of light signals, and (3) establishment of high-speed tracking capabilities.

Principally, measurement is achievable as far as there are light-receiving elements which correspond in number to a plurality of phase-different optical signals. Accordingly, in the case of four phase-different light signals, what is required is to use four light-receiving elements. An encoder of the first type is disclosed, for example, in the pamphlet of International Publication No. 01/31292 (see the specification, page 5, line 19 to page 6, line 7, along with FIG. 5).

Incidentally, deviation or fluctuation sometimes takes place in light amount due to the light source's optical intensity distribution and/or dirt on the surface of a scale. According to the above-noted type of encoder, this is easily affectable by such light amount irregularity, because an optical signal with each phase is sensed at a single location. For example, suppose that the layout position of a light-receiving element used for the phase A is weaker in intensity of irradiation light than the layout position of another light-receiving element. If this is the case, an output of the phase A becomes weaker, resulting in a likewise decrease in measurement accuracy.

A known approach to avoiding this is to employ a second type of encoder, which has an array of fine-divided light-receiving elements. More specifically, these fine-divided light-receiving elements are placed to have an array-like layout to thereby make them function also as index gratings. Furthermore, the light-receiving elements are disposed along the encoder's measurement axis direction ("x" direction) while being organized into a plurality of sets, each of which consists of four light-receiving elements used for the phases A, B, AA and BB. This type is disclosed, for example, in Published Japanese Patent Application No. 7-151565 (JP-A-7-151565), Paragraph "[0014]" and FIG. 4. This layout of such light-receiving elements is called the one-dimensional (1D) layout. According to the second type, the location whereat an optical signal with each phase is sensed is dispersed to cover a wide range. Thus it is possible to lessen the influenceability of light-amount irregularity. This will be referred to as the "averaging effect" hereinafter. Moreover, a third type of encoder is also available. This encoder is aimed at further enhancement of the averaging effect. To do this, the encoder is arranged so that multiple sets of light-receiving elements are laid out along a "y" direction in addition to the measurement axis direction ("x" direction). This type is disclosed, for example, in the pamphlet of International Publication No. 01/31292 (see the specification, page 21, line 6 to page 22, line 23, and also FIG. 16). This layout of light-receiving elements is called the two-dimensional (2D) layout.

BRIEF SUMMARY OF THE INVENTION

Enhancing the averaging effect is important to improve the measurement accuracy. Unfortunately, mere enhancement of the averaging effect would result in a decrease in response speed of the encoder. This will be explained in detail below.

Light-receiving elements such as photodiodes are typically structured to have a p-n junction with an n-type semiconductor layer being in contact with a p-type semiconductor layer. If the capacitance of this junction becomes larger, then the encoder decreases in response speed. Thus, an increase in junction capacitance affects the performance of encoder. The junction capacitance of a light-receiving element is in correlation with the area of a light acceptance surface and/or the length of circumference (edges) of the light acceptance surface. In short, an Increase in area or circumferential length results in a likewise increase in junction capacitance; a decrease in area or circumferential length results in a decrease in junction capacitance.

In the second and third types stated above, the light-receiving elements for use therein become greater in number than those of the first type even when a total sum of the areas of light acceptance surfaces is the same as that of the first type. Thus, a total of circumferential lengths becomes larger in value. Accordingly, the second and third types become greater in junction capacitance than the first type, resulting in a decrease in encoder response speed. It is thus apparent that with the prior art techniques, whenever an attempt is made to simply enhance the averaging effect, the light-receiving elements increase in junction capacitance.

The third type is such that light-receiving elements are disposed two-dimensionally to thereby enhance the averaging effect to a level higher than that of the second type with the one-dimensional layout of light-receiving elements. However, in the 2D layout, the light-receiving elements are disposed along the measurement axis direction ("x" direction) and also along the "y" direction. Due to this, the third type becomes greater than the second type in number of light-receiving elements used. This results in an increase in junction capacitance of the light-receiving elements, causing the encoder response-speed drop-down problem to become more significant.

The present invention has been made in view of the problems stated above, and its object is to provide a photoelectric encoder capable of obtaining the averaging effect similar to that of the 2D layout of light-receiving elements while at the same time permitting a total of junction capacitance values of a plurality of light-receiving elements to stay at a level almost equivalent to that of 1D layout.

A photoelectric encoder in accordance with this invention comprises a light source, a scale including a first optical grating for receiving irradiation of light from the light source, a plurality of light-receiving elements each having a light acceptance surface for incidence of an optical signal as generated based on the light falling onto the first optical grating, and a second optical grating including more than one light shield portion as disposed above each light acceptance surface of the plurality of light-receiving elements. The plurality of light-receiving elements are disposed movably relative to the scale along a measurement axis and disposed along the measurement axis so that each light acceptance surface is slanted with respect to an extending direction of the light shield portion.

According to the photoelectric encoder in accordance with the invention, this encoder has a structure that a plurality of light-receiving elements are laid out along the measurement axis while letting each light acceptance surface be slanted or tilted relative to the extending direction of light shield portions of the second optical grating. Accordingly, while disposing the plurality of light-receiving elements in a single direction, it is possible to establish a state similar to that of the case where they are disposed in two directions (i.e., in the measurement axis direction and the extending direction of light shield portions). Thus it is possible to obtain the averaging effect which is comparable to that in the 2D layout of light-receiving elements while at the same time enabling a total value of junction capacitances of the plurality of light-receiving elements to be almost equal to that of the 1D layout.

In the photoelectric encoder of the invention, another arrangement is employable which follows. A plurality of light-receiving elements are organized into first and second element groups each having a projected portion at one end and a recessed portion at the other end, which groups are arranged along the measurement axis on a plane on which the plurality of light-receiving elements are disposed. The first and second element groups may be arranged so that either projected portions or recessed portions thereof are laid out to face each other on the plane.

With such an arrangement, it is possible to dispose, in a well-balanced way, the light acceptance surfaces that are slanted relative the extending direction of light shield portions on the plane on which the plurality of light-receiving elements are laid out.

In the photoelectric encoder of the invention, this encoder may be arranged to comprise an optical receipt chip including the plurality of light-receiving elements and the second optical grating. This chip may be arranged to further include a contact portion which is provided for each of the light-receiving elements and which is connected to the light shield portion beneath this light shield portion with electrical conductivity while being in contact with the light acceptance surface, and more than one electrical wiring line which is provided for each of the light-receiving elements and which is connected to the light shield portion.

With this feature, the light shield portions of the second optical grating function also as wiring lines to be connected to the light-receiving elements. Thus it is possible to prevent unwanted reduction of the effective or "net" photosensitive area of the light acceptance surface.

In the photoelectric encoder of the invention, the second optical grating may be arranged to have portions which are disposed on or above the light acceptance surfaces of two neighboring ones of the plurality of light-receiving elements and which differ from each other in spatial phase of light shield portions. With this feature, it is possible for neighboring light-receiving elements to detect optical signal different in phase from each other.

In the photoelectric encoder of the invention, the light acceptance surfaces may be arranged so that these are disposed along the measurement axis while letting a portion or the whole of light acceptance surface be slanted or tilted with respect to the extending direction of light shield portion.

DETAILED DESCRIPTION OF THE INVENTION

First and second embodiments of a photoelectric encoder in accordance with this invention will be explained with reference to the accompanying drawings below. Note here that in the drawings for explanation of the second embodiment, parts or components denoted by the same reference characters as those of its preceding embodiment are added the same reference characters, and an explanation thereof will be omitted.

FIRST EMBODIMENT

Figure 1:
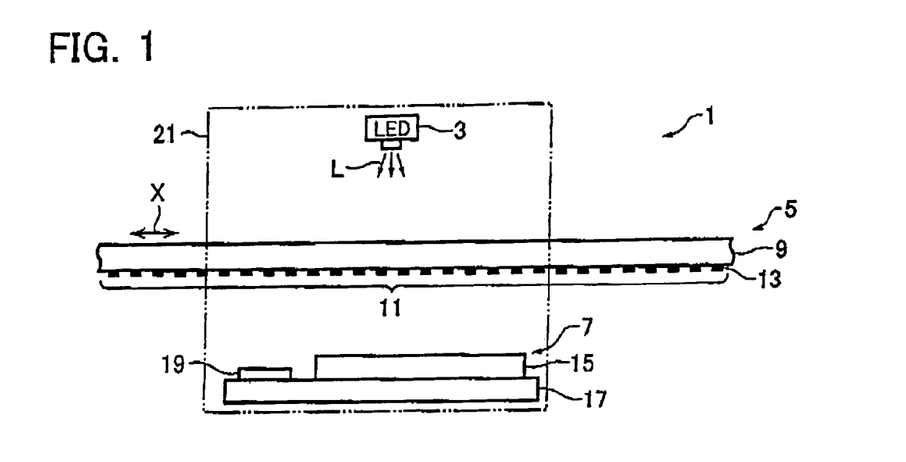
FIG. 1 is a diagram schematically showing a configuration of a photoelectric encoder in accordance with a first embodiment of the invention.

FIG. 1 is a diagram schematically showing a configuration of a photoelectric encoder 1 in accordance with the first embodiment. Although a main feature of this embodiment lies in the structure of an optical receipt chip that is included in a light-receiving unit, an explanation will first be given of the photoelectric encoder 1 per se for purposes of facilitation of the understanding of this feature. First, an arrangement of the photoelectric encoder 1 will be set forth. This encoder 1 is generally structured from a light-emitting diode (LED) 3, a scale 5 and a light-receiving unit 7. The scale 5 and light-receiving unit 7 are disposed in an order of sequence closer to the LED 3.

The LED 3 is one example of a light source, Light L from LED 3 falls onto the scale 5. Scale 5 includes a transparent substrate 9, which is made of an optically transparent material, such as glass or the like. Its part is depicted in FIG. 1. A first optical grating 11 is formed on a surface of transparent substrate 9, which is on the opposite side to the other substrate surface facing the LED 3 side. First optical grating 11 includes a plurality of light shielding portions 13, which are linearly disposed with a prespecified interval or "pitch" defined between adjacent ones thereof. Each light shield portion 13 extends in a direction perpendicular to the drawing sheet. Light shied 13 is made of a chosen metal (for example, chromium) or else.

The light-receiving unit 7 is disposed with a gap provided between itself and the scale 5. Light-receiving unit 7 includes an optical receipt chip—say, photosensor chip—15 which is positioned on the scale 5 side and also includes a printed circuit board 17 on which this chip is mounted. A plurality of photodiodes (sometimes referred to as "PDs" hereinafter) are formed within the photosensor chip 15, although not specifically illustrated herein. A respective one of these PDs has a light acceptance surface with photosensitivity, which faces the first optical grating 11 side. PD is one example of a light-receiving element. In place of the PD, a photo-transistor may be used as the light-receiving element. An integrated circuit (IC) chip 19 for the arithmetic processing use is mounted on the circuit board 17. This IC chip 19 is operable to execute arithmetical processing of a position change amount based on optical signals as detected by a plurality of PDs of the photosensor chip 15.

The light-receiving unit 7 is attached to a holder 21 together with the LED 3. The holder 21 is designed so that it is movable and slidable along the elongate direction of the scale 5, indicated by "X" in FIG. 1. More specifically, the illustrative photoelectric encoder 1 measures a displacement amount while letting the holder 21 move with respect to the scale 5 that is immovably secured. Hence, the X direction becomes a measurement axis (this X direction will be referred to hereinafter as "measurement axis X"). Note here that the present invention is also applicable to another type of device which measures a displacement amount by causing the scale 5 to move while fixing LED 3 and light-receiving unit 7. Accordingly, the light-receiving unit 7 including the photosensor chip 15 is laid out so that this is relatively movable together with LED 3 with respect to scale 5 in the direction of measurement axis X.

A measurement operation of the photoelectric encoder 1 will be explained in brief below. When light L is given off from the LED 3 and then falls onto the first optical grating 11 of the scale 5, a light-and-shade pattern takes place on the photosensor chip 15 due to the presence of first optical grating 11. This light-and-shade pattern is irradiated onto the photosensor chip 15. In this state, the holder 21 is driven to move along the measurement axis X direction so that each photodiode (PD) formed on photosensor chip 15 detects a change of the light/shade pattern thus created (i.e. an optical signal with a sinusoidal or "sine" waveform). More precisely, four phase-different optical signals are respectively sensed by their corresponding PDs—namely, an optical signal with phase "A" (zero degrees), an optical signal with phase "B" (90 degrees) that is shifted or offset in phase by 90 degrees from the phase A, a light signal with phase "AA" (180 degrees) that is phase-shifted by 180 degrees from the phase A, and a light signal with phase "BB" (270 degrees) as phase-shifted by 270 degrees from the phase A. In this way, each PD receives a certain one of multiple phase-different light signals which has its unique phase assigned thereto.

An electrical signal produced by receipt of each optical signal is sent forth toward the IC chip 19. IC chip 19 performs specified processing (including removal of DC components) with respect to the phases A and B; thereafter, a displacement amount is arithmetically determined based on the phases A and B thus processed. This result is output to a display unit, not shown. The above is the operation of the photoelectric encoder 1.

Figure 2:
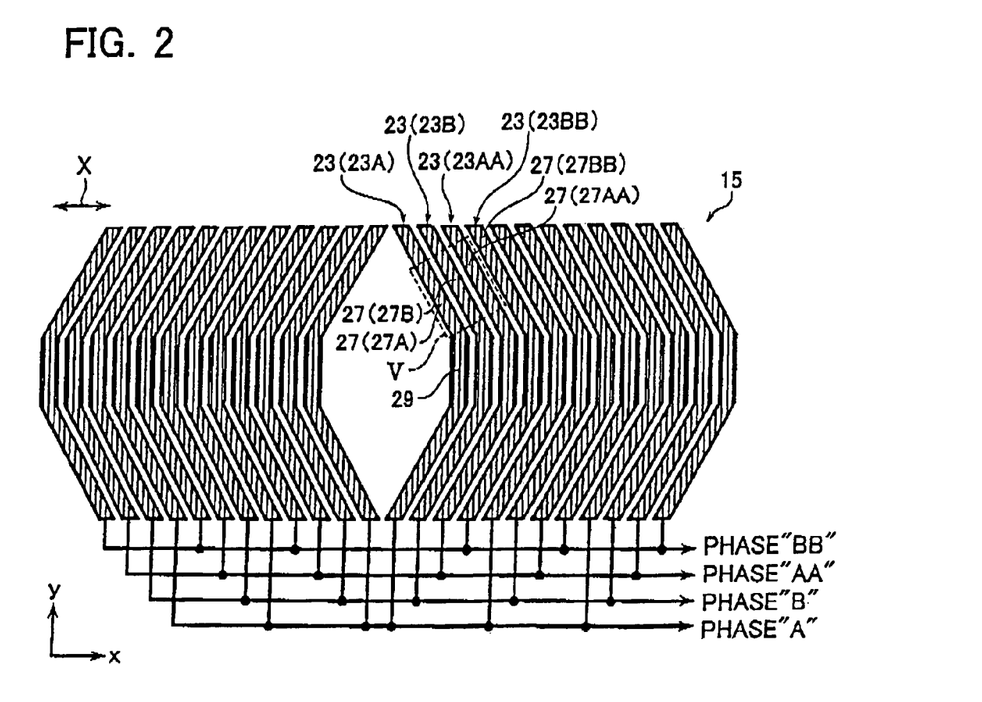
FIG. 2 is a diagram pictorially representing a plan view of the entirety of an optical receipt chip when looking at from the first optical grating side of FIG. 1.
Figure 3:
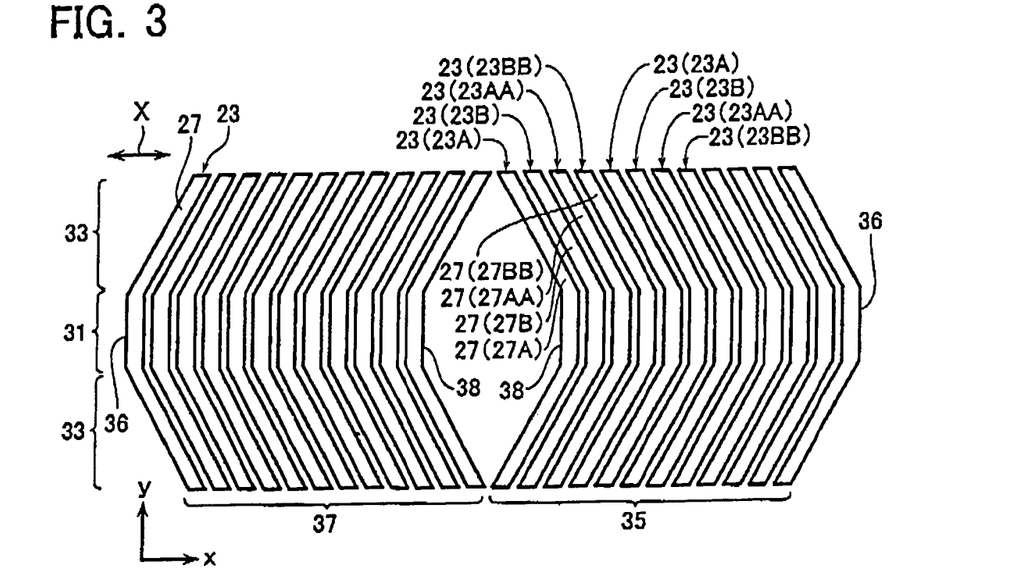
FIG. 3 is a diagram pictorially representing only photodiodes of the components of FIG. 2.
Figure 4:
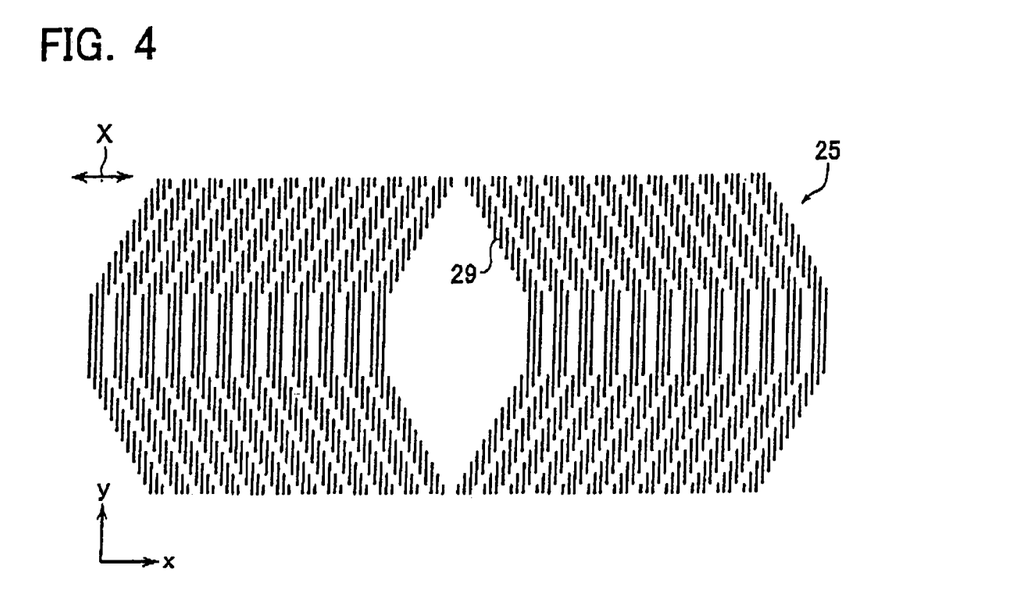
FIG. 4 is a pictorial representation of only second optical grating of the components of FIG. 2.

Now then, a principal feature of the first embodiment lies in the photosensor chip 15, which will be explained in detail. An explanation will first be given of a planar structure of photosensor chip 15. FIG. 2 is a diagram pictorially representing a plan view of an entirety of the photosensor chip 15 when looking it at from the first optical grating side. FIG. 3 is a pictorial representation of only the photodiodes 23 among the components shown in FIG. 2. FIG. 4 pictorially shows the second optical grating 25 only.

Referring to FIGS. 2 to 4, light acceptance surfaces 27 of a plurality of PDs 23 and a second optical grating 25 which is formed to cover the acceptance surfaces 27 are laid out on an "xy" plane that opposes the first optical grating. Note that the "x" axis is identical in direction to the measurement axis X stated previously in conjunction with FIG. 1. The second optical grating 25 has a plurality of light shielding portions 29 extending in the "y" direction, which are disposed on or above respective light acceptance surfaces 27, with an interval defined between adjacent ones of them.

Four phase-different optical signals (with phases "A," "B," "AA" and "BB"), which are produced based on light irradiated onto the first optical grating, are guided to fall onto their corresponding light acceptance surfaces 27, respectively. In other words in the state that the above-noted light-and-shade pattern is being radiated onto the photosensor chip 15, an optical signal with an assigned phase among a plurality of phase-different optical signals being generated by movement of the holder 21 enters each light acceptance surface 27. Whereby, the four phase-different optical signals are detected or sensed by a plurality of PDs 23. A set of PDs 23A. 23B, 23AA and 23BB which detect light signals with the phases A, B, AA and BB respectively is disposed repeatedly along the measurement axis X.

A light acceptance surface 27 is made up of a parallel portion 31 and a pair of slant portions 33 which are placed at the both ends of this parallel portion 31 and disposed symmetrically with respect thereto. The parallel portion 31 is laid out in a specific direction along which the light shield portions 29 of second optical grating 25 extend, that is, in parallel with the y direction. The slant portions 33 are disposed obliquely relative to the extending direction of light shield portions 29. Due to this, part of the light acceptance surface 27 is to be slanted or titled with respect to the extending direction of light shields 29. Optionally, an entirety of light acceptance surface 27 may be slanted relative to the extending direction of light shields 29.

The slant portions 33 may also be explained in a way which follows. A pair of slant portions 33 included in one light acceptance surface 27 are disposed so that these are mutually inversely inclined by the same degree. The slant portions 33 (i.e., at least part of each light acceptance surface 27) are disposed obliquely with respect to both the extending direction of light shields 29 and the measurement axis X.

The layout of multiple PDs 23 includes an ensemble of PDs 23 constituting the right half of FIG. 3, which is a first element group 35. The PD layout also includes another ensemble of PDs 23 making up the left half of FIG. 3, which is a second element group 37. A respective one of the first element group 35 and second element group 37 has a projected portion at one terminate end along the measurement axis X and a recessed portion 38 at the other end. These are disposed in the xy plane so that the recess 38 of first element group 35 and the recess 38 of second element group 37 oppose each other.

Figure 5:
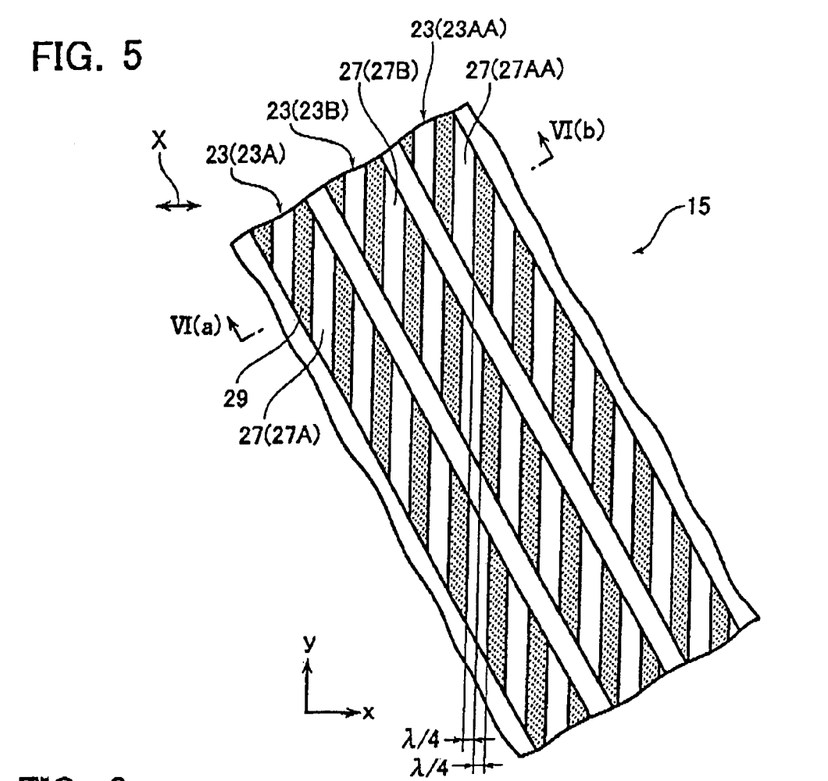
FIG. 5 is an enlarged plan view of a region indicated by "V" in FIG. 2.
Figure 6:
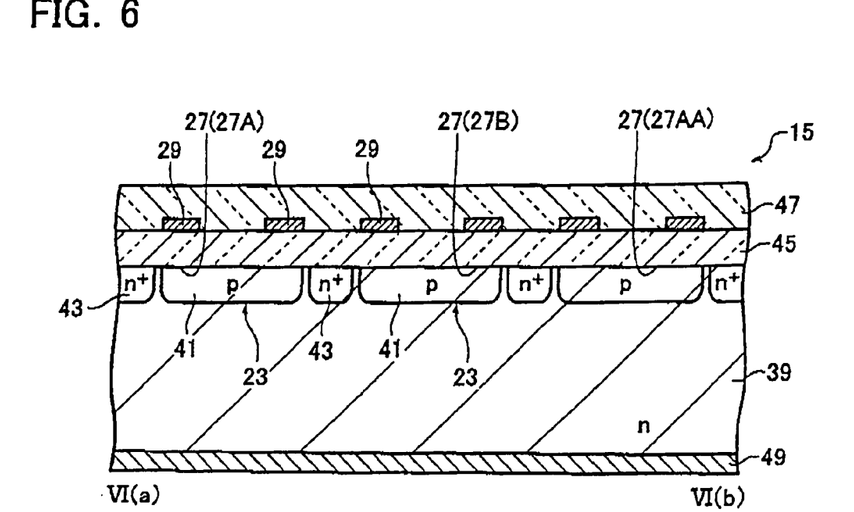
FIG. 6 is a pictorial representation of a cross-sectional structure of the region of FIG. 5 as taken along line VI(a)–VI(b).

An enlarged plan view of a region indicated by "V" in FIG. 2 is shown in FIG. 5. Light shield portions 29 are formed on each light acceptance surface 27, with a specified pitch between adjacent ones thereof. The second optical grating 25 has segments which are disposed to overlie the light acceptance surfaces 27 of neighboring PDs 23 and which are different from each other in spatial phase of light shied portion 29. More specifically, at the locations above the neighboring acceptance surfaces 27, light shield portions 29 are disposed along the measurement axis X with a positional shift or offset of λ/4, where λ is the wavelength of optical signal. FIG. 6 depicts a cross-sectional structure of the region of FIG. 5 as taken along line VI(a)–VI(b). The photosensor chip 15 has an a-type semiconductor substrate 39. This substrate 39 has one surface, in which p-type diffusion regions 41 are formed with an interval provided between adjacent ones thereof. A junction between the semiconductor substrate 39 and each diffusion region 41 becomes a PD 23. The plurality of PDs 23 shown in FIG. 3 are formed in the semiconductor substrate 39 along the measurement axis X so that PDs 23 are arranged in an array. Certain regions of the one surface of semiconductor substrate 39, in which the p-type diffusions 41 are formed, are for use as the light acceptance surfaces 27. A heavily-doped n ($n^+$) type diffusion region 43 is formed at a surface portion residing between two adjacent diffusions 41 in semiconductor substrate 39. Owing to this, each p-type diffusion 41 is electrically separated from its neighboring p-diffusions 41. Each PD 23 is thus element-isolated.

The one surface of the semiconductor substrate 39 is covered or coated with a dielectric film 45 such as a silicon oxide film, which is formed to cover the diffusion regions 41 and 43. Multiple spaced-apart light shield portions 29 are formed at intervals on the dielectric film 45. These light shields 29 may have the nature of blocking transmission of any incoming light rays. Thus, these light shields are made of opaque materials, such as metals (e.g., chromium, aluminum or else) or resin materials or any equivalents thereto. To cover these light shields 29, a protective film 47 is formed. This film 47 may be a silicon oxide film or silicon nitride film. The semiconductor substrate 39 has the other surface, on the entire area of which a common electrode (e.g. Au electrode) 49 of each PD 23 is formed.

Effects and advantages of the photoelectric encoder 1 in accordance with the first embodiment will be explained below.

(1) According to the first embodiment, it is possible to obtain the measurement accuracy expected in the case of two-dimensional (2D) photodiode layout while simultaneously achieving the encoder's response speed equivalent to that in the case of one-dimensional (1D) PD layout. This will be explained in detail by using FIGS. 2–4. Photodiodes 23 are laid out along the measurement axis X. Hence, the photodiodes 23 are of 1D layout. Thus it is possible to suppress an increase in junction capacitance of PDs 23. On the other hand, since the slant portions 33 of light acceptance surfaces 27 are tilted with respect to the extending direction (y direction) of the light shield portions 29 of second optical grating 25, these slants 33 are to be laid out two-dimensionally both in the measurement axis X direction (x direction) and in the extending direction (y direction) of light shields 29. Consequently according to the encoder 1, it is possible to obtain the averaging effect similar to that in the 2D layout of photodiodes.

It is thus apparent that according to the first embodiment, it is possible to obtain the averaging effect comparable to that in the 2D photodiode layout while at the same time reducing the total of junction capacitances of multiple photodiodes to a level similar to that in the 1D layout. This makes it possible to achieve improvements in response speed of the encoder 1 and also in measurement accuracy.

The above-noted advantage is derived inherently from the presence of the slant portions 33. In view of this, each light acceptance surface 27 may be structured from only a pair of slant portions 33, while eliminating the use of parallel portions 31. Alternatively the acceptance surface 27 may be formed of only one of such paired slants 33.

(2) As shown in FIG. 3, according to the first embodiment, the plurality of PDs 23 are organized into the first element group 35 and second element group 37. And, on the xy plane, specific layout design is made causing the recessed portion 38 of first element group 35 to oppose the recess 38 of second element group 37. Accordingly the resultant shape configured by the light acceptance surfaces 27 of multiple PDs 23 is a symmetrical shape with respect to both the x direction and the y direction. Thus it is possible to dispose the acceptance surfaces 27 of multiple PDs 23 in a well-balanced manner.

Figure 7:
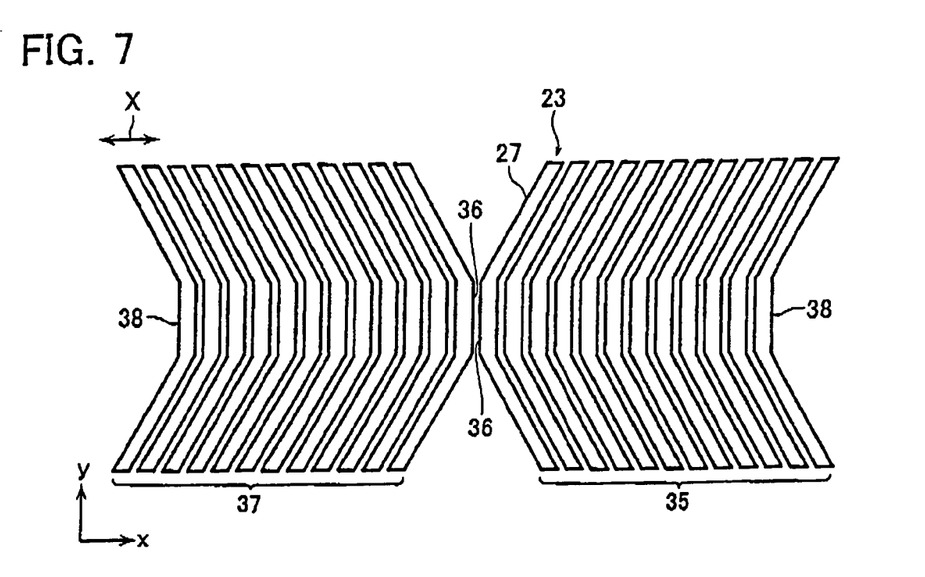
FIG. 7 is a diagram pictorially representing a modified example of the photodiode layout of the first embodiment.

It should be noted that even when the projected portion 36 of first element group 35 and the projection 36 of second element group 37 are laid out to oppose each other as shown in FIG. 7, it is still possible to place the light acceptance surfaces 27 of PDs 23 in a well-balanced manner as in the structure of FIG. 3.

SECOND EMBODIMENT

Figure 8:
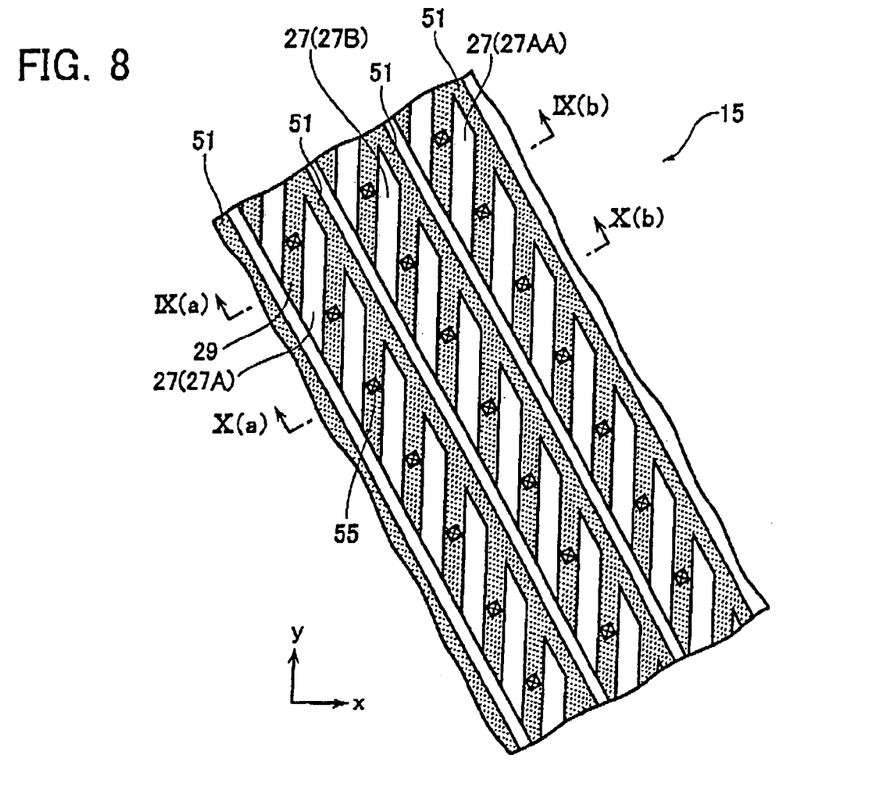
FIG. 8 is a pictorially represented plan view of part of an optical receipt chip used in a photoelectric encoder in accordance with a second embodiment.
Figure 9:
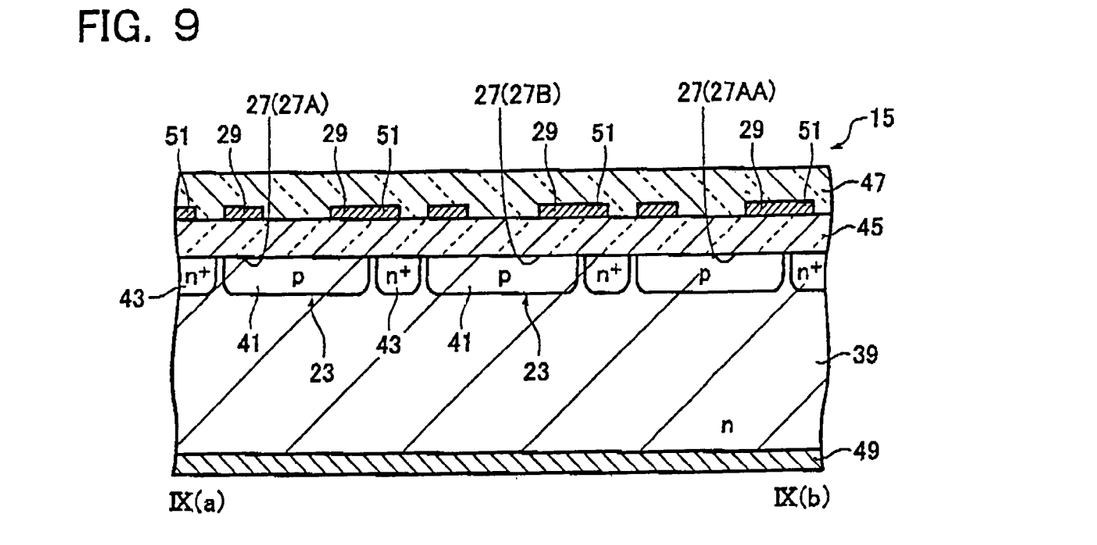
FIG. 9 pictorially shows a cross-sectional structure of the optical receipt chip of FIG. 8 as taken along line IX(a)–IX(b).
Figure 10:
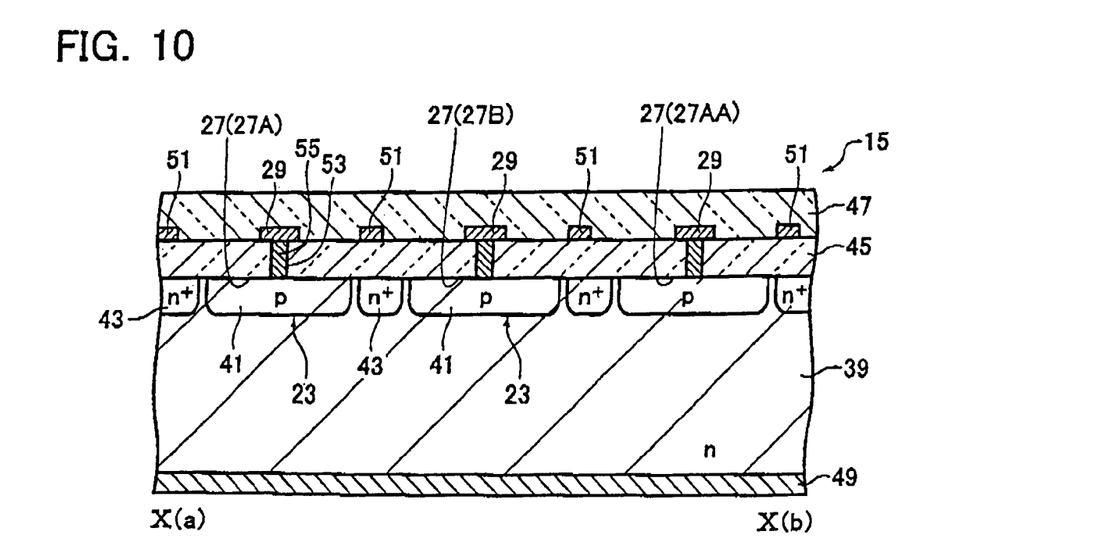
FIG. 10 is a sectional view of the FIG. 8 chip taken along line X(a)–X(b).

An explanation will be given of a second embodiment while focusing it to differences from the first embodiment. FIG. 8 pictorially represents a plan view of part of a photosensor chip 15 equipped in a photoelectric encoder of the second embodiment. This view corresponds to FIG. 5. FIG. 9 pictorially shows a cross-sectional structure of the sensor chip 15 as taken along line IX(a)–IX(b), while FIG. 10 is a sectional view of it taken along line X(a)–X(b). In the second embodiment, a light shield portion 29 of the second optical grating is arranged to act also as part of electrical wiring lines 51 connected to photodiodes 23. Below is a detailed explanation thereof.

Light shield portions 29 are made of metals with high conductivity, such as aluminum. Electrical wiring lines 51 reside at the same layer as that of light shields 29. Wiring lines 51 are fabricated by patterning at the same time during patterning of shields 29 so that wires 51 are connected to shields 29. Contact holes 53 are formed in a dielectric film 45 between shields 29 and light acceptance surfaces 27. In these contact holes 53, contact portions 55 are formed which consist essentially of conductive plugs (e.g., aluminum). These contacts 55 underlie light shields 29 and are connected thereto while being in contact with their associative light acceptance surfaces 27. Accordingly, wires 51 are connected to photodiodes 23 by shields 29 and contacts 55. Note here that although in this embodiment the conductive plugs are formed of contacts 55, another arrangement is available which follows: during fabrication of a film for later use as the light shields 29 on the dielectric film 45, let this film be buried in contact holes 53 and then use buried film portions as the contacts required.

The second embodiment has the following advantages, in addition to the advantages similar to those of the first embodiment. In case a conductive film is newly fabricated on the light acceptance surfaces 27 at the same layer as the light shields 29 in order to connect wiring lines to the photodiodes, the presence of this conductive film results in a decrease in effective photosensitive area of light acceptance surfaces 27. In contrast, the second embodiment is arranged so that conductive light shield portions 29 are utilized for electrical connection between wires 51 and photodiodes 23. Thus it is possible to prevent reduction of the net photosensitive areas of acceptance surfaces 27.

Additionally, in the case of the structure with the new conductive film formed therein, any contact portions 55 are absent in the cross-section of FIG. 10. This would result in formation of a parasitic capacitance component having its structure with dielectric film 45 sandwiched between light shields 29 and diffusion regions 41. This badly behaves to lower the response speed of the encoder. In contrast, since in the second embodiment the light shields 29 and diffusions 41 are connected together by contact portions 55, the above-noted parasitic capacitor component no longer takes place.

It must be noted that although in the first and second embodiments the measurement of a position change amount is done by use of four phase-different optical signals (i.e., light signals with the phases A, B, AA and BB), the photoelectric encoder of this invention should not be limited thereto. For example, three phase-different optical signals (i.e. a light signal with its phase of zero degrees, a light signal with its phase being offset by 120 degrees from 0 degrees, and a light signal with its phase offset by 240 degrees from 0 degrees) may alternatively be applicable to the photoelectric encoder of the invention.

Note that as shown in FIG. 1, the photoelectric encoders 1 in accordance with the first and second embodiments are of the so-called transmission type for performing the measurement of a displacement amount by use of the light L from LED 3 after having passed through the first optical grating 11 of scale 5. However, this invention is also applicable to photoelectric encoders of the reflection type—that is, in the case where a displacement amount is measured by using the light L from LED 3, which was reflected at the first optical grating 11 of scale 5.

As apparent from the foregoing description, according to the photoelectric encoder of this invention, it is possible to obtain the averaging effect similar to that in the 2D layout of light-receiving elements while at the same time permitting a total sum of junction capacitance values of a plurality of light-receiving elements to stay at a similar level to that in the 1D layout. Thus it is possible to achieve both an improvement in response speed of photoelectric encoder and an improvement in measurement accuracy at a time.

What is claimed is:

1. A photoelectric encoder comprising:
   a light source;
   a scale including a first optical grating for receiving irradiation of light from said light source;
   a plurality of light-receiving elements each having a light acceptance surface for incidence of an optical signal as generated based on the light falling onto said first optical grating, said plurality of light-receiving elements detecting a plurality of phase-different optical signals; and
   a second optical grating including more than one light shield portion disposed above each light acceptance surface of said plurality of light-receiving elements, and
   an optical receipt chip including said plurality of light-receiving elements and said second optical grating, wherein said optical receipt chip further includes,
   a contact portion provided for each of said plurality of light-receiving elements and connected to said light shield portion beneath said light shield portion with electrical conductivity while being in contact with said light acceptance surface, and
   an electrical wiring line provided for each of said plurality of light-receiving elements and connected to said light shield portion,
   wherein said plurality of light-receiving elements are disposed movably relative to said scale along a measurement axis and disposed along said measurement axis so that each light acceptance surface is slanted with respect to an extending direction of said light shield portion.

2. The photoelectric encoder according to claim 1, wherein said plurality of light-receiving elements are divided into first and second element groups each having a projected portion at one end and a recessed portion at a remaining end,
   wherein said first and second element groups are arranged along said measurement axis on a plane on which said plurality of light-receiving elements are disposed,
   and wherein said first and second element groups are laid out so that their recessed portions or projected portions face each other on said plane.

3. The photoelectric encoder according to claim 1, wherein a portion of said light acceptance surface is disposed along said measurement axis to be slanted with respect to the extending direction of said light shield portion.

4. The photoelectric encoder according to claim 1, wherein an entire part of said light acceptance surface is disposed along said measurement axis to be slanted with respect to the extending direction of said light shield portion.

5. The photoelectric encoder according to claim 1, wherein said second optical grating has portions being disposed above light acceptance surfaces of neighboring ones of said plurality of light-receiving elements and being different from each other in spatial phase of said light shield portion.

* * * * *

UNITED STATES PATENT AND TRADEMARK OFFICE
CERTIFICATE OF CORRECTION

PATENT NO.        : 7,095,011 B2                                    Page 1 of 1
APPLICATION NO. : 10/846437
DATED             : August 22, 2006
INVENTOR(S)       : Kojima et al.

It is certified that error appears in the above-identified patent and that said Letters Patent is hereby corrected as shown below:

Column 10, Line 50, (Claim 1, Line 29), after "that" iknsert --an extending direction of--.

Signed and Sealed this

Twenty-eighth Day of November, 2006

JON W. DUDAS
*Director of the United States Patent and Trademark Office*